United States Patent
Miyawaki et al.

(10) Patent No.: US 9,634,363 B2
(45) Date of Patent: Apr. 25, 2017

(54) ELECTRIC STORAGE MODULE, ELECTRIC STORAGE APPARATUS, AND AIR PASSAGE CONNECTION MEMBER

(71) Applicant: GS Yuasa International Ltd., Kyoto-shi (JP)

(72) Inventors: Yasutaka Miyawaki, Kyoto (JP); Yoshihiro Dote, Kyoto (JP); Hiroshi Yamashiro, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 282 days.

(21) Appl. No.: 14/242,400

(22) Filed: Apr. 1, 2014

(65) Prior Publication Data

US 2014/0302371 A1 Oct. 9, 2014

(30) Foreign Application Priority Data

Apr. 8, 2013 (JP) .................................. 2013-080681

(51) Int. Cl.
| | |
|---|---|
| *H01M 10/60* | (2014.01) |
| *H01M 10/6556* | (2014.01) |
| *H01M 10/647* | (2014.01) |
| *H01M 10/6557* | (2014.01) |
| *H01M 10/617* | (2014.01) |
| *H01M 10/6561* | (2014.01) |

(Continued)

(52) U.S. Cl.
CPC ...... *H01M 10/5057* (2013.01); *H01M 2/1077* (2013.01); *H01M 10/613* (2015.04); *H01M 10/617* (2015.04); *H01M 10/647* (2015.04); *H01M 10/6556* (2015.04); *H01M 10/6557* (2015.04); *H01M 10/6561* (2015.04); *H01M 2/1061* (2013.01)

(58) Field of Classification Search
CPC .......... H01M 10/5057; H01M 10/613; H01M 10/617; H01M 10/647; H01M 10/6556; H01M 10/6557; H01M 10/6561
See application file for complete search history.

(56) References Cited

U.S. PATENT DOCUMENTS

| | | |
|---|---|---|
| 2003/0211384 A1 | 11/2003 | Hamada et al. |
| 2004/0180257 A1 | 9/2004 | Kimoto |

(Continued)

FOREIGN PATENT DOCUMENTS

| | | |
|---|---|---|
| JP | 2009-205820 A | 9/2009 |
| JP | 2010-272251 A | 12/2010 |

(Continued)

OTHER PUBLICATIONS

European Search Report dated Jul. 1, 2014.

*Primary Examiner* — Jonathan Jelsma
(74) *Attorney, Agent, or Firm* — McGinn IP Law Group, PLLC (57) ABSTRACT

An electric storage module includes an electric storage device, an air passage formed along the electric storage device, a frame that holds the electric storage device, the frame having an opening that is formed on an outer surface thereof and is in communication with the air passage, and an air passage connection member that encloses the opening of the frame. An electric storage apparatus includes a plurality of electric storage modules, and air passages of adjacent electric storage modules are connected to each other by an air passage connection member.

19 Claims, 4 Drawing Sheets

(51) Int. Cl.
*H01M 10/613* (2014.01)
*H01M 2/10* (2006.01)

(56) References Cited

U.S. PATENT DOCUMENTS

| | | |
|---|---|---|
| 2010/0297486 A1 | 11/2010 | Fujii |
| 2012/0177970 A1* | 7/2012 | Marchio ............ H01M 2/0237 429/120 |
| 2013/0202936 A1 | 8/2013 | Kosaki et al. |
| 2014/0120400 A1 | 5/2014 | Yoshioka et al. |

FOREIGN PATENT DOCUMENTS

| | | |
|---|---|---|
| JP | 2011-171175 A | 9/2011 |
| JP | 2012-190604 A | 10/2012 |
| JP | 2012-227120 A | 11/2012 |
| WO | WO 2012/028929 A1 | 3/2012 |
| WO | WO 2012/173269 A1 | 12/2012 |

\* cited by examiner

ELECTRIC STORAGE MODULE, ELECTRIC STORAGE APPARATUS, AND AIR PASSAGE CONNECTION MEMBER

CROSS-REFERENCE TO RELATED APPLICATION

This application claims priority to Japanese Patent Application No. 2013-080681, the disclosure of which is incorporated herein by reference in its entirety.

FIELD

The present invention relates to an electric storage module including an electric storage device such as a battery cell (an electric cell) or a capacitor and an air passage formed along the electric storage device, an electric storage apparatus including the electric storage module, and an air passage connection member that connects air passages of electric storage modules to each other.

BACKGROUND

There is a known electric storage apparatus including a plurality of electric storage devices aligned in the horizontal direction and the vertical direction and a frame that holds the plurality of electric storage devices, in which air passages are formed along the electric storage devices (see JP 2012-190604 A, for example).

Since the air passages are discontinuous, the electric storage device described above suffers from high pressure loss and great temperature difference between the cooling medium flowing in the upstream part of the air passages and the cooling medium flowing in the downstream part of the air passages. The electric storage apparatus may be unable to adequately cool the battery cells located in the downstream part of the air passages.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage module that allows a cooling medium to efficiently circulate in an air passage, an electric storage apparatus including the electric storage module, and an air passage connection member that connects air passages of electric storage modules to each other.

An electric storage module according to an aspect of the present invention includes an electric storage device, an air passage formed along the electric storage device, a frame that holds the electric storage device, the frame having an opening that is formed on an outer surface thereof and is in communication with the air passage, and an air passage connection member that encloses the opening of the frame.

BRIEF DESCRIPTION OF THE DRAWINGS

The foregoing and other features of the present invention will become apparent from the following description and drawings of an illustrative embodiment of the invention in which.

DETAILED DESCRIPTION OF THE PREFERRED EMBODIMENT

An electric storage module according to an aspect of an embodiment includes an electric storage device, an air passage formed along the electric storage device, a frame that holds the electric storage device, the frame having an opening that is formed on an outer surface thereof and is in communication with the air passage, and an air passage connection member that encloses the opening of the frame.

With such a configuration, since the air passage in which a cooling medium that cools the electric storage device flows is in communication with the opening in the outer surface of the frame, and the opening is enclosed by the air passage connection member, the interior of the air passage connection member also serves as an air passage. One side of the air passage formed along the electric storage device is referred to as upstream side, and the other side is referred to as a downstream side. In the electric storage module according to the one aspect of this embodiment, the cooling medium is likely to be easily introduced from the air passage formed by the air passage connection member into the upstream part of the air passage along the electric storage device. In addition, the cooling medium flows from the downstream part of the air passage along the electric storage device into the air passage formed by the air passage connection member without a leak. That is, the cooling medium is introduced from the air passage inside the air passage connection member into the upstream part of the air passage along the electric storage device, flows from the upstream part to the downstream part of the air passage along the electric storage device, and then flows into the air passage inside the air passage connection member connected downstream of the air passage along the electric storage device without a leak.

According to another aspect, the frame may include an end member extending in a direction along the air passage and a coupling member having the opening and coupled to the end member and seal an interior of the electric storage module except for the opening.

With the electric storage module having such a configuration, the cooling medium in the air passage does not leak except through the opening. In other words, the electric storage module prevents dissipation of the cooling medium by allowing the cooling medium in the air passage to flow out only through the opening.

According to still another aspect, the air passage connection member may be joined to the frame.

With such a configuration, the air passages of adjacent electric storage modules can be connected to each other by the air passage connection member connected to the frames of the electric storage modules.

According to still another aspect, it may be configured that the electric storage device includes a plurality of electric storage devices which are stacked in one direction, a plurality of air passages are formed along the plurality of electric storage devices, and the plurality of air passages are in communication with the opening of the frame.

With such a configuration, since the plurality of air passages are in communication with the opening of the frame, the cooling medium flowing in the plurality of air passages flows into the opening of the frame.

According to still another aspect, the plurality of air passages formed along the plurality of electric storage devices located in a middle part of the plurality of electric storage devices in the stacking direction may be in communication with the opening of the frame.

With such a configuration, the cooling medium can be supplied through the opening of the frame to the air passages formed along the electric storage devices in the middle part of the stack of the plurality of electric storage devices, which are more likely to increase temperature than the electric storage devices located at the ends of the stack.

According to still another aspect, the air passages formed along the electric storage devices located in end parts of the plurality of stacked electric storage devices in the stacking direction may be blocked.

With such a configuration, since the air passages formed along the electric storage devices located on the opposite outer sides of the stack of the plurality of electric storage devices are blocked, the cooling medium concentratedly flows in the air passages formed along the electric storage devices in the middle part of the stack of the plurality of electric storage devices and efficiently cools the electric storage devices.

An electric storage apparatus according to still another aspect includes a plurality of electric storage modules, each including an electric storage device, an air passage formed along the electric storage device, a frame that holds the electric storage device, the frame having an opening that is formed on an outer surface thereof and is in communication with the air passage, and an air passage connection member that encloses the opening of the frame, and the air passage connection member connects the air passages of the adjacent electric storage modules to each other.

With such a configuration, since the air passages of adjacent electric storage modules are connected to each other, the difference in temperature between the cooling medium in the air passage of one of the adjacent electric storage modules and the cooling medium in the air passage of the other of the adjacent electric storage modules is small, and occurrence of a pressure loss is suppressed.

According to still another aspect, it may be configured that the plurality of electric storage modules are arranged in a short direction thereof, the plurality of electric storage devices in each of the electric storage modules are arranged in a longitudinal direction of the electric storage modules, and the air passages of the electric storage modules extend in the short direction of the electric storage modules.

With such a configuration, since the plurality of electric storage modules are arranged in the short direction thereof, the openings of the air passages face each other between adjacent electric storage modules. There is also an electric storage apparatus in which a plurality of electric storage modules are arranged in the longitudinal direction thereof. With such an electric storage apparatus, the openings of the air passages do not face each other between adjacent electric storage modules, and the air passages spaced apart from each other are connected by an appropriate member. However, in the electric storage apparatus according to this embodiment, in which a plurality of electric storage modules are arranged in the short direction, the openings of the air passages face each other between adjacent electric storage modules, and the air passages of adjacent electric storage modules are connected straight to each other by the air passage connection member. As a result, the length of the entire air passage of the electric storage apparatus is shorter than that of the electric storage apparatus in which a plurality of electric storage modules are arranged in the longitudinal direction thereof. Therefore, the difference in temperature of the cooling medium between the air passages of the electric storage modules is smaller in the electric storage apparatus according to this embodiment in which the plurality of cell modules are arranged in the short direction thereof than in the electric storage apparatus in which the electric storage modules are arranged in the longitudinal direction thereof. In addition, with the electric storage apparatus according to this embodiment, the pressure loss in the air passage (the air passage formed by the air passages of the electric storage modules) is reduced.

An air passage connection member according to still another aspect includes a pair of annular joint portions each of which is capable of being joined to an annular flange formed on an outer surface of an electric storage module, the electric storage module including an electric storage device therein and having an opening that is formed in the outer surface thereof and is in communication with an air passage formed along the electric storage device, and the annular flange surrounding the opening, each of the pair of annular joint portions has such an annular shape that the annular joint portion faces with the annular flange along the entire circumference of the annular flange, and the pair of annular joint portions are indirectly or directly connected to each other along the entire circumference thereof.

With such a configuration, the air passages of adjacent electric storage modules are connected to each other by the annular joint portions of the air passage connection member being joined to the annular flanges formed on the outer surfaces of the electric storage modules. Therefore, the cooling medium flowing in the air passages of the electric storage module located on the upstream side is less likely to leak to the outside of the electric storage module owing to the air passage connection member and efficiently flows to the air passages of the cell module located on the downstream side.

The above-described aspects can advantageously provide an electric storage module that allows a cooling medium to efficiently circulate in an air passage, an electric storage apparatus including the electric storage module, and an air passage connection member that connects air passages of electric storage modules to each other.

In the following, an air passage connection member and an electric storage apparatus including the air passage connection member according to an embodiment of the present invention will be described with reference to the drawings. The electric storage apparatus includes a plurality of cell modules, which are electric storage modules according to an embodiment, arranged in line.

As shown in FIGS. 1 to 4, the cell module (electric storage module) 1 includes a plurality of battery cells (electric storage devices) 3 aligned (stacked) in a first direction (one direction), a plurality of spacers 5 disposed between adjacent battery cells 3 and at the opposite ends of the plurality of battery cells 3 in the first direction (stacking direction), a frame (a holder) 7 that holds the plurality of battery cells 3 and the plurality of spacers 5 to package them together, a cell monitor unit (CMU) module 9 that monitors at least one of the voltage, the current and the temperature of each of the plurality of battery cells 3, and an air passage connection member 20.

In following description, for the sake of convenience, the first direction is referred to as an X direction (which is the direction along the X axis of the orthogonal axes shown in the drawings). A second direction, which is orthogonal to the first direction, is referred to as a Y direction (which is the direction along the Y axis of the orthogonal axes shown in the drawings). A third direction, which is orthogonal to both the first and second directions, is referred to as a Z direction (which is the direction along the Z axis of the orthogonal axes shown in the drawings). In the drawings, a symbol X, Y or Z is appended to one of the heads of each two-way arrow indicating the X direction, the Y direction or the Z direction. Provided that the Z direction is vertical, the Z direction means the up-and-down direction, the Y direction means the left-and-right direction, and the X direction means the front-and-back direction.

Figure 4:
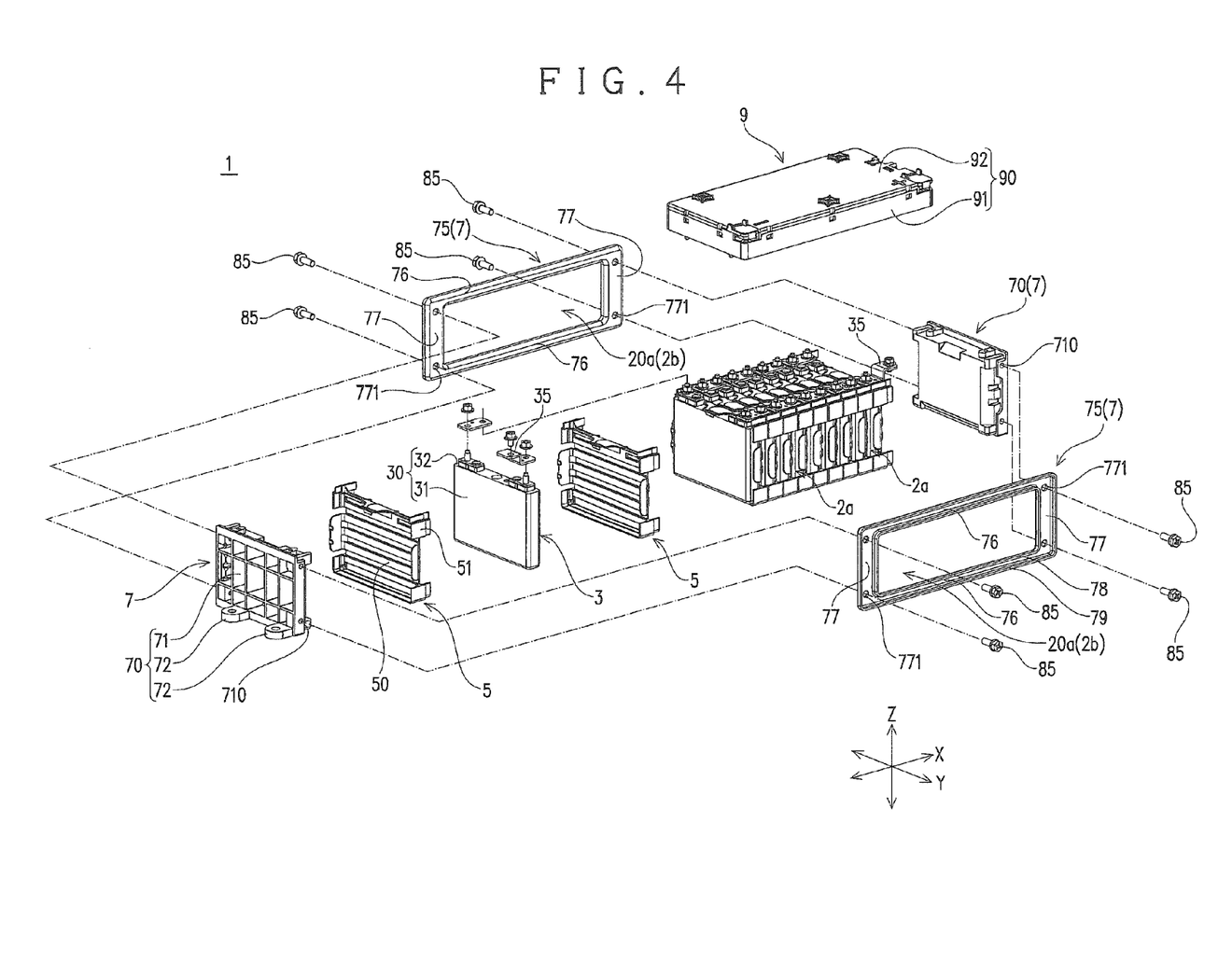
FIG. 4 is a perspective exploded view of a cell module of the electric storage apparatus.

As shown in FIG. 4, the battery cell 3 includes a case 30 having a case body 31 having an opening and a cover plate 32 that covers and seals the opening of the case body 31. An electrode assembly (not shown) including a positive electrode plate and a negative electrode plate insulated from each other is housed in the case 30. The battery cell 3 is a rectangular cell flattened in the X direction.

The spacer 5 is made of a synthetic resin and has insulating properties. The spacer 5 includes a spacer body 50 and holding portions 51 that extend from the spacer body 50 in the X direction and hold the battery cell 3 that faces the spacer body 50 in the X direction. The spacer body 50 has a rectangular shape that conforms to the rectangular shape of the case 30 of the battery cell 3 viewed in the X direction.

In the cell module 1 according to this embodiment, gaps are formed between adjacent battery cells 3 by the holding portions 51 of the spacers 5. The gaps formed between adjacent battery cells 3 serve as air passages 2a in which air, which is a cooling medium, flows. In other words, the air passages 2a are formed along the battery cells 3. The battery cells 3 are cooled by air flowing in the air passages 2a. The cell module 1 according to this embodiment adopts the air cooling system. The spacer body 50 of the spacer 5 has a rectangular wave-like shape in cross section in order to provide the air passage 2a, for example.

The frame 7 includes a pair of end members (so-called end plates) 70 and coupling members 75. The pair of end members 70 are disposed on the opposite sides of the plurality of battery cells 3 in the X direction and hold therebetween the plurality of battery cells 3 and the plurality of spacers 5 in the X direction. The coupling members 75 couple the pair of end members 70 to each other to secure the plurality of battery cells 3 and the plurality of spacers 5 together. The distance between the pair of end members 70 is longer than the distance between the pair of coupling members 75. That is, the side of the end members 70 extending in the Y direction corresponds to the short side of the cell module 1, and the side of the coupling members 75 extending in the X direction corresponds to the longitudinal side of the cell module 1.

The end members 70 are molded or otherwise formed from a metal such as aluminum. The end member 70 includes an end member body 71 in which a female thread 710 is formed along the Y direction, and leg portions 72 that protrude outward in the X direction from the bottom portion of the end member body 71. As with the spacer body 50, the end member body 71 has a substantially rectangular shape that conforms to the rectangular shape of the case 30 of the battery cell 3 viewed in the X direction. The end member body 71 has a rectangular frame portion and a lattice of ribs formed inside the frame portion. The end member body 71 is lightweight although it has a certain thickness in the X direction, and is rigid.

In this embodiment, the two end members 70 paired with each other have the same shape. That is, in this embodiment, two end members 70 having the same shape are once arranged in the same orientation, and then one of the end members 70 is inverted 180 degrees (or rotated 180 degrees about the Z axis) so that the two end members 70 are arranged with the inner surfaces facing each other.

A pair of coupling members 75 are provided on the opposite sides of the plurality of battery cells 3 in the Y direction. That is, a cell module 1 according to the present embodiment includes one coupling member 75 disposed to face the plurality of battery cells 3 at one end of the plurality of battery cells 3 in the Y direction, and the other coupling member 75 disposed to face the plurality of battery cells 3 at the other end of the plurality of battery cells 3 in the Y direction.

The coupling members 75 each include a pair of transverse beams 76 extending along the X direction in parallel with an interval to each other, and a pair of vertical beams 77, respectively coupling one end portions to each other, and the other end portions to each other in the X direction of the pair of transverse beams 76. The coupling members 75 each have an opening 20a in the outer surface thereof. The opening 20a is defined by the pair of transverse beams 76 and the pair of vertical beams 77. The opening 20a forms an air passage 2b. The coupling member as a whole 75 is in the form of a rectangular frame.

The pair of vertical beams 77 of the coupling member 75 are overlaid on the end member bodies 71 of the end members 70. Through-holes 771, through which threaded portions of bolts 85 are to be inserted, penetrate the pair of vertical beams 77 of the coupling member 75 in the Y direction. A pair of through-holes 771 formed at an interval from each other in the Z direction are provided in each of one end portion and the other end portion of the coupling member 75 in the X direction (referred to simply as a one end portion and the other end portion, hereinafter).

The coupling member 75 has an inner-circumferential annular flange 78 formed on the outer surface (the surface opposite to that in contact with the battery cell 3) along the inner circumferential edge of the frame shape and an outer-circumferential annular flange 79 formed on the outer surface along the outer circumferential edge of the frame shape. The inner-circumferential annular flange 78 protrudes from the outer surface of the coupling member 75 so as to surround the opening 20a in the outer surface. The inner-circumferential annular flange 78 and the outer-circumferential annular flange 79 are formed by bending a plate-shaped member (a plate), for example.

The cell monitor unit module 9 is a cell monitor unit housed in a unit case 90. The unit case 90 includes a case body 91 having an opening and a cover plate 92 that covers the opening of the case body 91 and seals the same.

In the cell module 1 configured as described above, the plurality of battery cells 3 are stacked in the X direction with the spacers 5 interposed between the battery cells 3. The spacers 5 are also disposed on the outer sides of the outermost ones of the plurality of battery cells 3. Furthermore, the pair of end members 70 are disposed on the outer sides of the pair of outermost spacers 5. With a compression force in the X direction applied across the pair of end members 70, the pair of coupling members 75 are disposed to hold therebetween the plurality of the battery cells 3 in the Y direction. Threaded portions of bolts 85 inserted in through-holes 771 of the coupling members 75 are screwed into female threads 710 in the end members 70, thereby integrating the plurality of battery cells 3 and the plurality of spacers 5 with the frame 7. The cell monitor unit module 9 is attached to the plurality of battery cells 3 from the Z direction.

In the cell module 1 according to this embodiment, the air passages 2a are formed in the Y direction along the case bodies 31 of the battery cells 3. The cell module 1 is sealed except for the openings 20a (of the coupling members 75) of the frame 7. The air passages 2a formed along the battery cells 3 and the openings 20a of the frame 7 (the air passages 2b in the frame 7) are connected to each other. That is, the air passages 2a and the air passages 2b are in communication with each other to form an air passage of the cell module 1.

Figure 1:
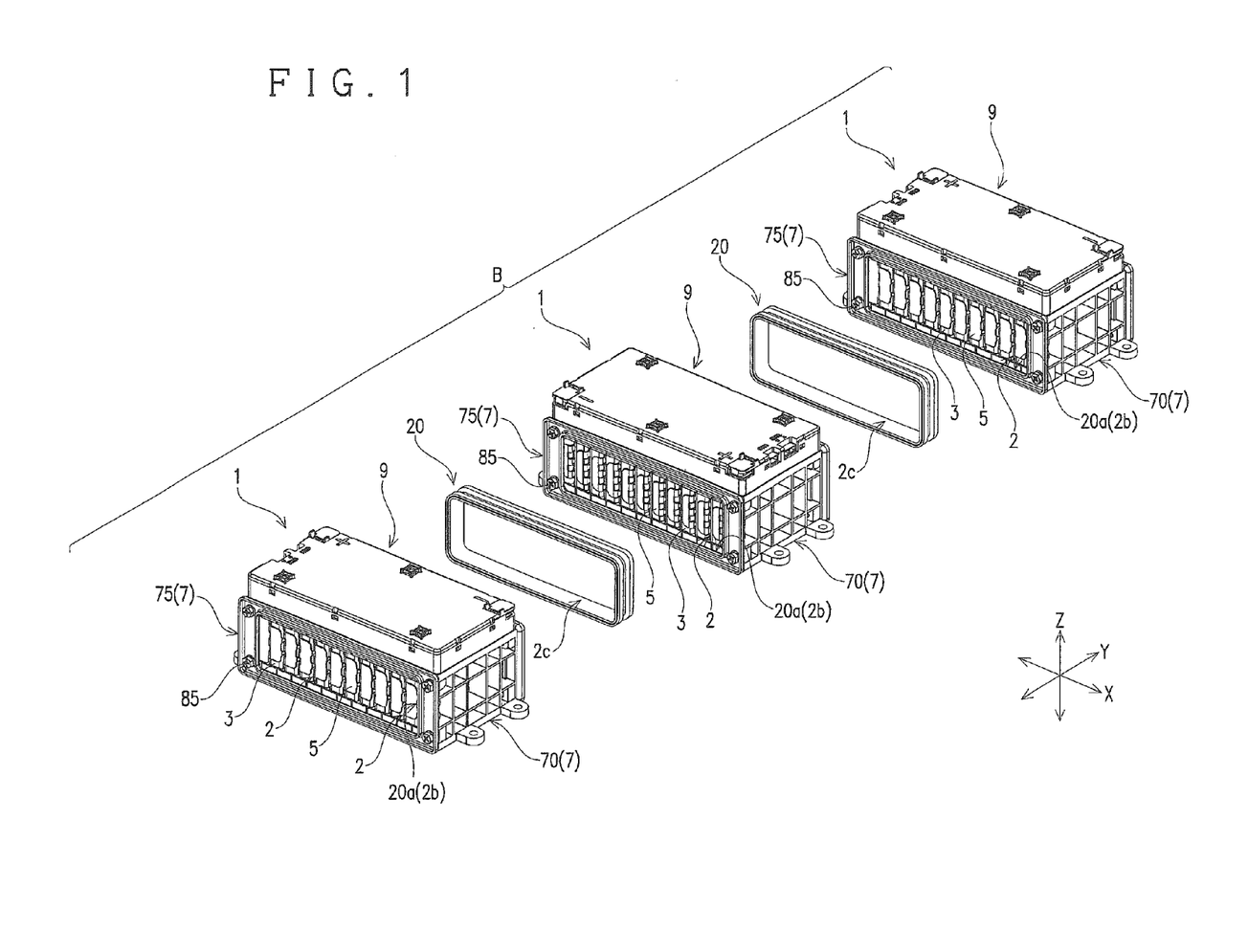
FIG. 1 is a perspective exploded view of an electric storage apparatus including a cell module according to an embodiment of the present invention.

An electric storage apparatus B shown in FIG. 1 is formed by a plurality of cell modules 1 according to this embodiment arranged side by side in the short direction (since FIG. 1 is a perspective exploded view, the plurality of cell modules 1 shown are separated from each other). In the electric storage apparatus B, the openings 20a of the frames 7 of adjacent cell modules 1 face each other. In addition, in the electric storage apparatus B, the inner-circumferential annular flanges 78 of adjacent cell modules 1, and the outer-circumferential annular flanges 79 of adjacent cell modules 1, face each other at a distance.

In the electric storage apparatus B, the inner-circumferential annular flanges 78 of adjacent cell modules 1 are joined to each other by air passage connection members 20. The air passage connection member 20 includes a pair of annular joint portions 21 joined to the respective inner-circumferential annular flanges 78 and an annular intermediate portion 22. Each of the pair of annular joint portions 21 has an annular shape and faces the annular flange (the inner-circumferential annular flange 78) of the cell module 1 along the entire circumference of the annular flange. The pair of annular joint portions 21 are directly or indirectly connected to each other along the entire circumference thereof. In this embodiment, the pair of annular joint portions 21 are indirectly connected to each other along the entire circumference thereof. The intermediate portion 22 has a first end and a second end, which is opposite to the first end. The intermediate portion 22 is hermetically joined to one of the annular joint portions 21 (the one located on the upstream side) at the first end along the entire circumference thereof. The intermediate portion 22 is hermetically joined to the other of the annular joint portions 21 (the one located on the downstream side) at the second end along the entire circumference thereof.

Figure 2:
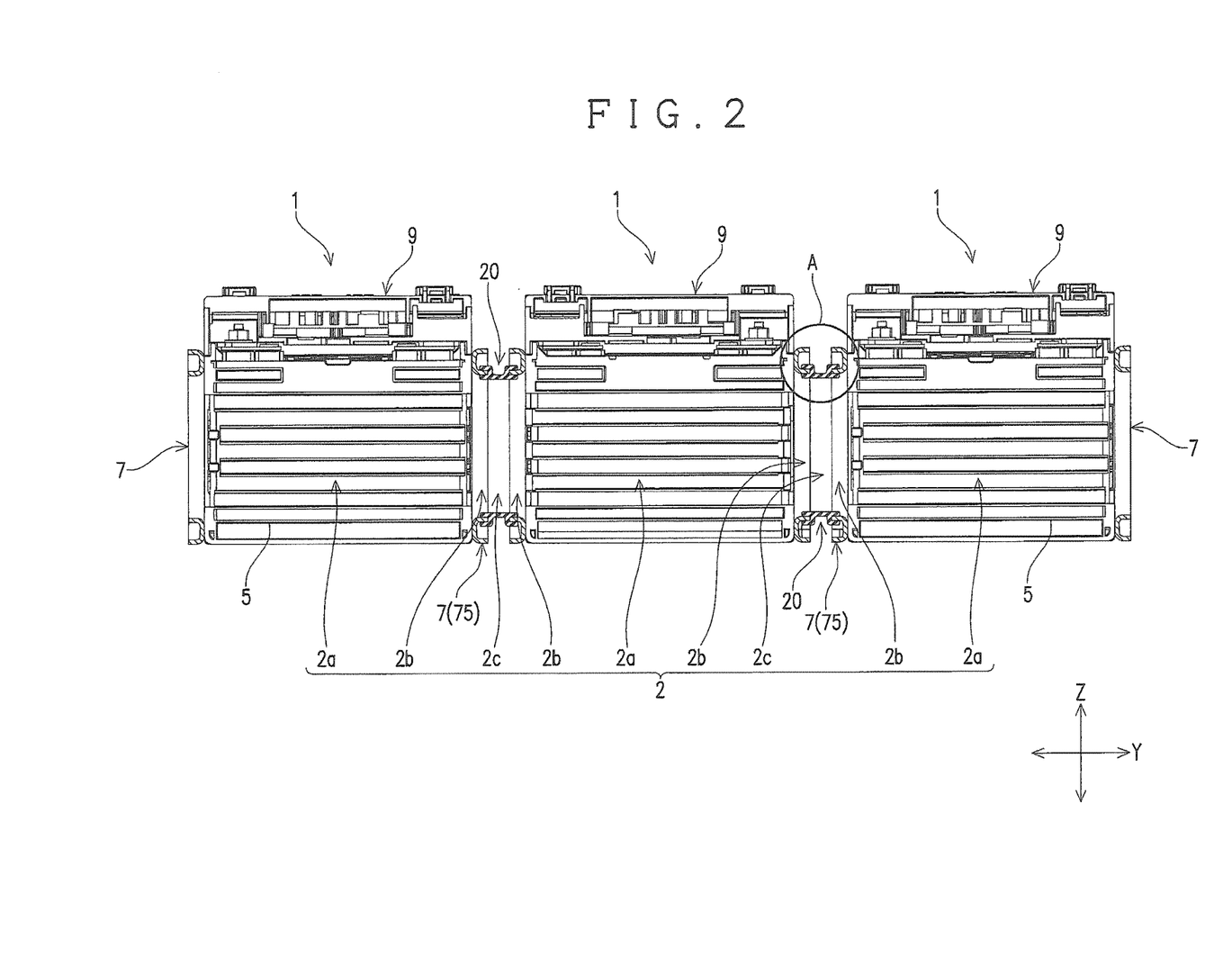
FIG. 2 is a front view in cross section of the electric storage apparatus.
Figure 3:
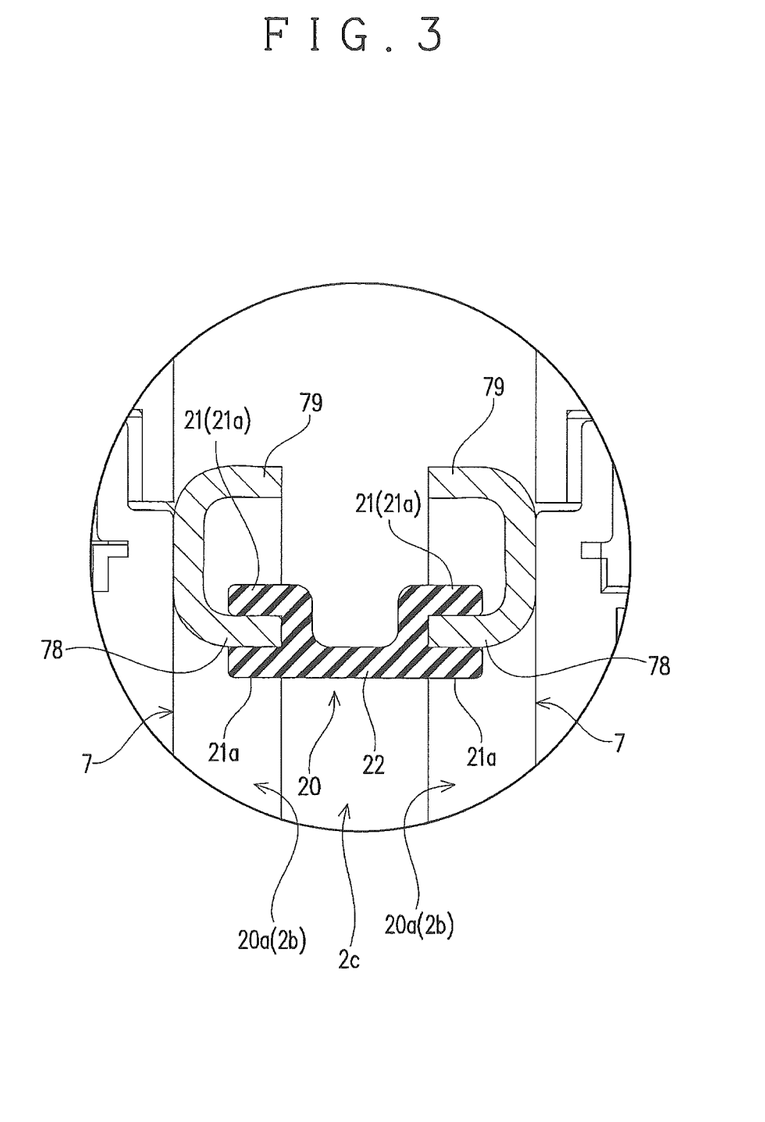
FIG. 3 is an enlarged view of part A in FIG. 2.

Each annular joint portion 21 has a pair of catching pieces 21a. The pair of catching pieces 21a of one of the pair of annular joint portions 21 hold therebetween the inner-circumferential annular flange 78 of the coupling member 75 of the cell module 1 located on the upstream side, and the pair of catching pieces 21a of the other of the pair of annular joint portions 21 hold therebetween the inner-circumferential annular flange 78 of the coupling member of the cell module located on the downstream side. As shown in FIGS. 2 and 3, the annular joint portion 21 has an angled U shape in cross section.

Each of the catching pieces 21a of the annular joint portions 21 and the intermediate portion 22 have the same thickness. Therefore, the intermediate portion 22 is connected to the annular joint portions 21 with the inner surface thereof being continuous with the inner surfaces of the inner catching pieces 21a. Alternatively, the intermediate portion 22 may be connected to the annular joint portions 21 with the outer surface thereof being continuous with the outer surfaces of the outer catching pieces 21a. Alternatively, the intermediate portion 22 may be connected to the bent part of the pair of catching pieces 21a. Alternatively, the intermediate portion 22 may have a thickness equal to the distance between the catching pieces 21a on the inner circumferential side and the catching pieces 21a on the outer circumferential side.

The annular joint portions 21 are made of a resin material having elasticity, such as rubber. The annular joint portions 21 and the intermediate portion 22 may be integrally formed. In the case where the annular joint portions 21 and the intermediate portion 22 are integrally formed, the intermediate portion 22 is also made of a resin material having elasticity. The annular joint portions 21 made of a resin material having elasticity are in intimate contact with the inner-circumferential annular flanges 78 of the cell modules 1.

The air passage connection member 20 has an opening defined by the pair of annular joint portions 21 and the annular intermediate portion 22. The opening of the air passage connection member 20 serves as an air passage 2c. The air passage 2c of the air passage connection member 20 is in communication with the air passages formed in the electric storage module 1 (more specifically, the air passages 2a formed along the battery cells 3 and the air passage 2b of the frame 7 in communication with each other, referred to as the air passages 2a and 2b of the electric storage module 1 hereinafter). In short, in the electric storage apparatus B, the air passages 2a and 2b of a cell module 1 (a cell module located on the upstream side) are linearly connected to the air passages 2a and 2b of the adjacent cell module 1 (a cell module located on the downstream side) by the air passage 2c of the air passage connection member 20. In other words, the air passages 2a and 2b of adjacent cell modules 1 and the air passage 2c of the air passage connection member 20 disposed therebetween form a continuous air passage 2.

Therefore, in the electric storage apparatus B, the cooling medium flowing in the air passages 2a formed along the battery cells 3 of the cell module 1 and the air passage 2b of the frame 7 located on the upstream side smoothly flows into the air passage 2c of the air passage connection member 20 without pressure loss. The cooling medium further smoothly flows into the air passages 2a formed along the battery cells 3 of the cell module 1 and, the air passage 2b of the frame 7 located on the downstream side without pressure loss. In addition, the annular joint portions 21 of the air passage connection member 20 are in intimate contact with the inner-circumferential annular flanges 78 of the cell modules 1 on the opposite sides thereof. This ensures that the cooling medium does not leak from between the air passages 2a and 2b of the cell modules 1 and the air passage 2c of the air passage connection member 20.

Therefore, in the electric storage apparatus B, a small fan may be provided at the downstream end or upstream end of the air passage 2 so that the cooling medium flows from the upstream to the downstream of the air passage 2.

In the electric storage apparatus B, the cooling medium flows in the air passages 2a and 2b formed in the cell module 1 located on the upstream side and cools the battery cells 3. The cooling medium smoothly flows in the air passage 2c of the air passage connection member 20. The cooling medium then smoothly flows in the air passages 2a and 2b formed in the cell module 1 located on the downstream side without pressure loss. The temperature of the cooling medium flowing in the air passages 2a and 2b formed in the cell module 1 located on the downstream side is not significantly different from the temperature of the cooling medium when flowing in the air passages 2a and 2b of the cell module 1 located on the upstream side, and the cooling medium cools the battery cells 3 in the cell module 1 located on the downstream side.

With the cell module 1 configured as described above, the cooling medium fed into the air passages 2a for cooling the battery cells 3 flows out through the opening 20a of the frame 7, which is in communication with the air passages 2a. Since the opening 20a is enclosed by the air passage connection member 20, the cooling medium having flowed out through the opening 20a (the air passage 2b) does not dissipate but appropriately flows to the electric storage module 1 located on the downstream side, for example.

In addition, with the cell module 1 configured as described above, since the interior of the cell module 1 is sealed by the frame 7 at all parts other than the opening 20a (except for the opening 20a), the cooling medium flowing in the air passages 2a and 2b does not leak at any part other than the opening 20a. In other words, the cooling medium flowing in the air passages 2a and 2b flows to the outside of the cell module 1 only through the opening 20a and does not dissipate.

In addition, with the electric storage apparatus B configured as described above, the air passages 2a and 2b of adjacent cell modules 1 are connected to each other by the air passage connection member 20. This ensures that the temperature difference between the cooling medium in the air passages 2a and 2b of the cell module 1 located on the upstream side and the cooling medium in the air passages 2a and 2b of the cell module 1 located on the downstream side is small. In addition, the pressure loss in the air passages connecting the air passages 2a and 2b of a plurality of electric storage modules 1 in the electric storage apparatus B is reduced.

In addition, with the electric storage apparatus B configured as described above, since a plurality of cell modules 1 are arranged in the short direction thereof, the openings of the air passages 2a (the openings 20a of the frames 7) face each other between adjacent cell modules 1. In an electric storage apparatus including a plurality of cell modules 1 arranged in the longitudinal direction thereof, the openings of the air passages 2a (the openings 20a of the frames 7) do not face each other between adjacent cell modules 1, so that the openings of the air passages 2a and 2b (the openings 20a of the frames 7) of adjacent cell modules 1, which are spaced apart from each other, are connected by an appropriate member such as a duct. With the electric storage apparatus B according to this embodiment, however, the openings of the air passages 2a and 2b face each other between adjacent cell modules 1, so that the air passages 2a and 2b of adjacent cell modules 1 are connected straight to each other by the air passage connection member 20. In other words, a straight air passage 2 is formed. As a result, the length of the entire air passage is shorter than in the electric storage apparatus in which a plurality of cells modules 1 are arranged in the longitudinal direction thereof. Therefore, the difference in temperature of the cooling medium between the air passages 2a and 2b of a plurality of cell modules 1 arranged in the short direction thereof is smaller than the difference in temperature of the cooling medium between the air passages 2a and 2b of a plurality of cell modules 1 arranged in the longitudinal direction thereof. In addition, the pressure loss in the air passage 2 is reduced.

In addition, with the air passage connection member 20 configured as described above, the annular joint portions 21 of the air passage connection member 20 are joined to the inner-circumferential annular flanges 78 on the outer surfaces of the frames 7 of adjacent cell modules 1, thereby connecting the air passages 2a and 2b of the adjacent cell modules 1. Therefore, the cooling medium flowing in the air passages 2a and 2b of the cell module 1 located on the upstream side is less likely to leak to the outside of the cell module 1 and efficiently flows to the air passages 2a and 2b of the cell module 1 located on the downstream side.

The cell module 1, the air passage connection member 20, and the electric storage apparatus B according to the present invention is not limited to the embodiment described above, and various modifications can be made without departing from the spirit of the present invention.

For example, in the embodiment described above, the air passage connection member 20 connects the air passages 2a and 2b of the cell module 1 located on the upstream side and the air passages 2a and 2b of the cell module 1 located on the downstream side. However, the air passage connection member 20 may be coupled to the inlet air passages of the most upstream one of the plurality of cell modules 1. When the air passage connection member 20 is coupled to the inlet air passages 2a and 2b of the most upstream cell module 1, the cooling medium can be more easily introduced into the air passages 2a and 2b of the most upstream cell module 1. Alternatively, the air passage connection member 20 may be coupled to the outlet air passages 2a and 2b of the most downstream one of the plurality of cell modules 1. When the air passage connection member 20 is coupled to the outlet air passages 2a and 2b of the most downstream cell module 1, the cooling medium flows, without a leak, into a module, an exhaust passage or the like disposed downstream of the most downstream cell module 1.

In the embodiment described above, the frame 7 includes a pair of end members 70 and a pair of coupling members 75. This ensures that the battery cells 3 and the spacers 5 are prevented from being displaced, and the circulation of the cooling medium is less disturbed. Alternatively, however, the frame 7 may be formed by a housing having an open-top square shape. The frame having an open-top square shape has a rectangular bottom plate, and a pair of end plates and a pair of side plates standing from the edges of the bottom plate. The bottom plate has thin plate-shaped positioning ribs. The positioning ribs are inserted into the gaps between the adjacent battery cells 3 to fix the battery cells 3. The end plates face in the Y direction, the side plates face in the X direction, and the side edges of the end plates and the side edges of the side plates are joint to each other.

The side plates each include a pair of transverse beams extending along the X direction in parallel with an interval to each other, and a plurality of vertical beams that couples the pair of transverse beams in the Z direction. The vertical beams are provided along the edges of the case bodies 31 of the battery cells 3. That is, the openings of the air passages 2a formed along the battery cells 3 are exposed between adjacent vertical beams. In short, the frame having the side plates having a pair of transverse beams and a plurality of vertical beams can form an air passage connection member.

In the embodiment described above, the vertical beams 77 of the coupling member 75 are overlaid on the end members 70 and do not block the air passage 2a along the battery cell 3 adjacent to the end member 70. That is, the opening 20a formed in the coupling member 75 is connected to the openings of all the air passages 2a. In view of the fact that battery cells 3 closer to the center of the cell module 1 in the X direction (battery cells 3 in the middle part of the cell module 1 in the X direction) are more likely to increase temperature than battery cells 3 closer to the end members 70, however, the air passage connection member 20 may enclose the openings of the air passages 2a formed along battery cells 3 located in the middle part of the cell module 1 in the X direction. In other words, the vertical beams 77 of the coupling member 75 may have such a width that the vertical beam 77 blocks the air passage 2a between the end member 70 and the battery cell 3 adjacent to the end member 70 and blocks the air passage 2a formed along the battery cell 3 adjacent to the end member 70. When the air passage 2a between the end member 70 and the battery cell 3 adjacent to the end member 70 and the air passage 2a formed along the battery cell 3 adjacent to the end member 70 are blocked, the cooling medium can concentratedly flow into the air passages 2a formed along the battery cells 3 in the middle part and can efficiently cool the battery cells 3 in the middle part, which are more likely to increase temperature.

In addition, in the embodiment described above, the air passage connection member 20 has a pair of catching pieces 21a each of which holds therebetween the inner-circumferential annular flange 78 of the cell module 1. Alternatively, however, the air passage connection member 20 may not have the catching pieces 21a, and the annular joint portion 21 may be a simple annular member. In that case, the air passage connection member 20 is joined to the cell module 1 by fitting the annular joint portion 21 of the air passage connection member 20 around the annular flange of the cell module 1.

In addition, in the embodiment described above, the air passage connection member 20 includes the annular intermediate portion 22. Alternatively, however, the air passage connection member 20 may not have the intermediate portion 22 and may be formed by a pair of annular joint portions 21 connected directly to each other. When the clearance between the inner-circumferential annular flanges 78 of adjacent cell modules 1 is narrow, the inner-circumferential annular flanges 78 of the cell modules 1 are joined to each other by the annular joint portions 21 of the air passage connection member 20 without the intermediate portion 22.

In addition, in the embodiment described above, the annular joint portions 21 of the air passage connection member 20 are made of a resin material having elasticity. However, in the case where the annular joint portions 21 and the inner-circumferential annular flanges 78 are subjected to superprecision polishing, the annular joint portions 21 are in intimate contact with the inner-circumferential annular flanges 78 at the joint surfaces thereof, so that the annular joint portions 21 may not be made of a resin material having elasticity.

In addition, in the embodiment described above, the air passage connection member 20 is joined to the inner-circumferential annular flange 78 of the cell module 1. Alternatively, however, the air passage connection member 20 may be joined to the outer-circumferential annular flange 79 of the cell module 1.

In addition, in the embodiment described above, the air passage connection member 20 is formed separately from the inner-circumferential annular flange 78. Alternatively, however, the inner-circumferential annular flange 78 or the outer-circumferential annular flange 79 may serve as the air passage connection member 20. In the case where the inner-circumferential annular flange 78 or the outer-circumferential annular flange 79 serves as the air passage connection member 20, the inner-circumferential annular flanges 78, or the outer-circumferential annular flanges 79, of adjacent cell modules 1 are joined to each other. To this end, the joint surfaces of the inner-circumferential annular flanges 78 or outer-circumferential annular flanges 79 are shaped to fit each other without a gap.

In addition, in the embodiment described above, the inner-circumferential annular flange 78 and the outer-circumferential annular flange 79 are formed by bending a plate-shaped member (a plate). However, in the case where the coupling member 75 has the shape of a frame, and the inner edge of the frame shape encloses the openings of the air passages 2a, the inner-circumferential annular flange 78 and the outer-circumferential annular flange 79 can be omitted. That is, the outer surfaces of the coupling members 75 of adjacent cell modules 1 are in intimate contact with each other so that the air passages 2a and 2b of the adjacent cell modules 1 can be connected to each other. In that case, the coupling members 75 of the adjacent cell modules 1 are preferably joined to each other with an adhesive, a seal member or the like in order to prevent leakage of the cooling medium.

In addition, in the embodiment described above, the cell module 1 includes the air passage connection member 20. Alternatively, however, the air passage connection member 20 may be an independent constituent member separate from the cell module 1. In other words, the air passage connection member 20 may be a separate part to be connected to the cell module 1.

In addition, in the above embodiment, an electric storage apparatus including a plurality of electric storage modules arranged in the short direction thereof has been described. However, a plurality of (two, for example) electric storage modules may be arranged in the longitudinal direction thereof and coupled to each other by a single frame to form an electric storage apparatus.

In addition, the cell module 1 may include only a single battery cell 3, rather than a plurality of battery cells 3.

Furthermore, in the above embodiment, a lithium-ion secondary battery cell has been described. However, any type of cell with any size (capacity) is possible.

The present invention is not limited to the lithium-ion secondary battery cell. The present invention can be applied to various types of secondary cells, primary cells and capacitors such as an electric double layer capacitor.

While the electric storage module, the electric storage apparatus, and the air passage connection member according to the embodiments have been described above, it should be understood that the embodiments disclosed herein are illustrative and not limitative. The scope of the present invention is defined by the claims rather than by the preceding description, and all changes that fall within meets and bounds of the claims or equivalence of such meets and bounds are intended to be embraced by the claims.

What is claimed is:

1. An electric storage module comprising:
  a plurality of electric storage devices which are aligned in a first direction;
  an air passage formed between the plurality of electric storage devices;
  a frame that holds the plurality of electric storage devices, the frame having an opening that is formed on an outer surface thereof and is in communication with the air passage; and
  an air passage connection member that encloses the opening of the frame, and includes a joint portion extending in a second direction perpendicular to the first direction,
  wherein the frame comprises a flange which extends in the second direction away from the plurality of electric storage devices and surrounds the opening of the frame, and the air passage connection member is joined to the flange.

2. The electric storage module according to claim 1, wherein the frame includes an end member extending in the second direction and a coupling member having the opening and coupled to the end member and seals an interior of the electric storage module except for the opening.

3. The electric storage module according to claim 1, wherein the air passage comprises a plurality of air passages formed along the plurality of electric storage devices, and
the plurality of air passages are in communication with the opening of the frame.

4. The electric storage module according to claim 3, wherein the plurality of air passages formed along the plurality of electric storage devices located in a middle part of the plurality of electric storage devices in the first direction are in communication with the opening of the frame.

5. The electric storage module according to claim 4, wherein the plurality of air passages formed along the electric storage devices located in end parts of the plurality of stacked electric storage devices in the stacking direction are blocked.

6. The electric storage module according to claim 1, wherein the frame comprises:
first and second end plates formed on opposing ends of the plurality of electric storage devices in the first direction; and
first and second coupling members formed on opposing ends of the plurality of electric storage devices in the second direction and connected to the first and second end plates, the opening of the frame being formed in a coupling member of the first and second coupling members.

7. The electric storage module according to claim 6, wherein the coupling member comprises the flange and the joint portion of the air passage connection member includes an annular joint portion joined to the flange.

8. The electric storage module according to claim 7, wherein the annular joint portion comprises an elastic portion.

9. The electric storage module according to claim 7, wherein the coupling member comprises a frame shape, and the flange comprises an inner-circumferential annular flange along an inner circumferential edge of the frame shape and an outer-circumferential annular flange formed along an outer circumferential edge of the frame shape, and
wherein the annular joint portion is joined to the inner-circumferential annular flange.

10. The electric storage module according to claim 7, wherein the annular joint portion comprises a pair of catching pieces, the flange being held between the pair of catching pieces.

11. The electric storage module according to claim 10, wherein the air passage connection member further includes:
an intermediate portion connected to the annular joint portion; and
an other joint portion connected to the intermediate portion.

12. The electric storage module according to claim 11, wherein the pair of catching pieces comprises a first catching piece which is adjacent the opening of the frame, and an inner surface of the first catching piece is continuous with an inner surface of the intermediate portion.

13. The electric storage module according to claim 11, wherein the air passage connection member comprises an opening which is defined by the annular joint portion, the intermediate portion and the other annular joint portion, and
wherein the opening of the air passage connection member and the opening of the frame serve as other air passages which are in communication with the air passage formed along the electric storage device.

14. The electric storage module according to claim 1, wherein the joint portion of the air passage connection member is joined to the flange.

15. The electric storage module according to claim 1, wherein the flange is inserted into the joint portion of the air passage connection member.

16. The electric storage module according to claim 1, wherein the air passage connection member comprises an other joint portion formed on a side of the air passage connection member opposite the joint portion.

17. An electric storage apparatus comprising:
a plurality of electric storage modules, each comprising:
a plurality of electric storage devices which are aligned in a first direction;
an air passage formed between the plurality of electric storage devices;
a frame that holds the plurality of electric storage devices, the frame having an opening that is formed on an outer surface thereof and is in communication with the air passage; and
an air passage connection member that encloses the opening of the frame, and includes a joint portion extending in a second direction perpendicular to the first direction,
wherein the air passage connection member connects the air passages of the adjacent electric storage modules to each other, and
wherein the frame comprises a flange which extends in the second direction away from the plurality of electric storage devices and surrounds the opening of the frame, and the air passage connection member is joined to the flange.

18. The electric storage apparatus according to claim 17, wherein the plurality of electric storage modules are arranged in the second direction, and the air passage of the electric storage modules extend in the second direction.

19. An air passage connection member comprising:
a pair of annular joint portions each of which is capable of being joined to an annular flange formed on an outer surface of an electric storage module, the electric storage module including an electric storage device therein and having an opening that is formed in the outer surface thereof and is in communication with an air passage formed along the electric storage device, and the annular flange surrounding the opening,
wherein each of the pair of annular joint portions has such an annular shape that the annular joint portion faces with the annular flange along the entire circumference of the annular flange, and the pair of annular joint portions are indirectly or directly connected to each other along the entire circumference thereof, and
wherein the annular joint portion comprises a pair of catching pieces, the annular flange being held between the pair of catching pieces.

* * * * *